US008777579B2

(12) United States Patent
Hancock et al.

(10) Patent No.: US 8,777,579 B2
(45) Date of Patent: Jul. 15, 2014

(54) METHOD OF MANUFACTURING A SPAR FOR A WIND TURBINE FROM ELEMENTS COMPRISING DIFFERENT MATERIALS

(75) Inventors: Mark Hancock, Southhampton (GB); Andrew Hedges, Southhampton (GB); Tomas Vronsky, Woolston (GB)

(73) Assignee: Vestas Wind Systems A/S, Aarhus N. (DK)

( * ) Notice: Subject to any disclaimer, the term of this patent is extended or adjusted under 35 U.S.C. 154(b) by 876 days.

(21) Appl. No.: 12/999,173

(22) PCT Filed: Jun. 19, 2009

(86) PCT No.: PCT/EP2009/057684
§ 371 (c)(1),
(2), (4) Date: Apr. 1, 2011

(87) PCT Pub. No.: WO2009/153343
PCT Pub. Date: Dec. 23, 2009

(65) Prior Publication Data
US 2011/0189025 A1    Aug. 4, 2011

Related U.S. Application Data

(60) Provisional application No. 61/132,791, filed on Jun. 20, 2008.

(30) Foreign Application Priority Data

Jun. 20, 2008  (DK) .................................. 2008 00851

(51) Int. Cl.
*F03D 1/06*    (2006.01)
(52) U.S. Cl.
USPC ........................................................ 416/233
(58) Field of Classification Search
CPC ................................ F03D 1/065; F03D 1/0675

USPC ................... 416/226, 233; 244/123.8, 123.9
See application file for complete search history.

(56) References Cited

U.S. PATENT DOCUMENTS 4,732,542 A    3/1988  Hahn et al.
5,547,629 A    8/1996  Diesen et al.
(Continued)

FOREIGN PATENT DOCUMENTS

DE   10 2005 059 298    6/2006
DK       2002 00306    10/2002
(Continued)

OTHER PUBLICATIONS

Campbell, F.; Manufacturing Processes for Advanced Composites; 2004; 8 pages; XP-002544901.
(Continued)

*Primary Examiner* — Richard Edgar
(74) *Attorney, Agent, or Firm* — Wood, Herron & Evans, LLP

(57) ABSTRACT

The invention provides a method of manufacturing a spar (1) for a wind turbine blade. The method comprises steps of providing at least two caps (2a, 2b), each cap forming an intermediate portion (4) between two end portions (5), where the end portions each forms a cap joint surface portion (6) along a longitudinal extending edge of the end portion and the intermediate portion forms an outer surface portion (7) of the spar, providing at least two webs (3a, 3b), each web being provided with web joint surface portions (8) along opposite and longitudinally extending edges, and connecting the joint surface portions of the caps with the joint surface portions of the webs to form a tubular configuration of the spar. The intermediate portions and the end portions are provided so that they comprise different materials.

23 Claims, 12 Drawing Sheets

(56) References Cited

U.S. PATENT DOCUMENTS

| | | | |
|---|---|---|---|
| 6,237,873 B1 * | 5/2001 | Amaoka et al. | 244/123.7 |
| 2005/0186081 A1 | 8/2005 | Mohamed | |
| 2007/0251090 A1 | 11/2007 | Breugel et al. | |
| 2008/0145229 A1 * | 6/2008 | Llorente Gonzalez et al. | 416/230 |
| 2008/0181781 A1 | 7/2008 | Livingston et al. | |
| 2008/0206062 A1 | 8/2008 | Sanz Pascual et al. | |
| 2009/0068017 A1 | 3/2009 | Rudling | |
| 2009/0136355 A1 | 5/2009 | Finnigan et al. | |
| 2009/0155084 A1 | 6/2009 | Livingston et al. | |
| 2009/0226320 A1 | 9/2009 | Torres Martinez | |
| 2010/0135817 A1 | 6/2010 | Wirt et al. | |

FOREIGN PATENT DOCUMENTS

| | | |
|---|---|---|
| EP | 1 830 063 | 9/2007 |
| EP | 1 880 833 | 1/2008 |
| EP | 1 965 074 | 9/2008 |
| ES | 2343712 A1 | 8/2010 |
| WO | 01/46582 | 6/2001 |
| WO | 2004/078461 | 9/2004 |
| WO | 2004/078465 | 9/2004 |
| WO | 2005/050808 | 6/2005 |
| WO | 2007/054088 | 5/2007 |
| WO | 2008/052677 A2 | 5/2008 |
| WO | 2008/071195 | 6/2008 |

OTHER PUBLICATIONS

Campbell, F.; Manufacturing Processes for Advanced Composites; 2004; 6 pages; XP-002544902.

Daniel Gay; Materiaux Composites; 1997; 2 pages; XP-002544903.

Sven Hytoft Rasmussen, Ph.D.; 1st Technical Examination Report issued in priority Denmark Application No. PA 2008 00851; Feb. 3, 2009; 4 pages; Denmark Patent and Trademark Office.

Fabien Jouannon; International Search Report and Written Opinion issued in priority International Application No. PCT/EP2009/057684; Jan. 29, 2010; 19 pages; European Patent Office.

\* cited by examiner

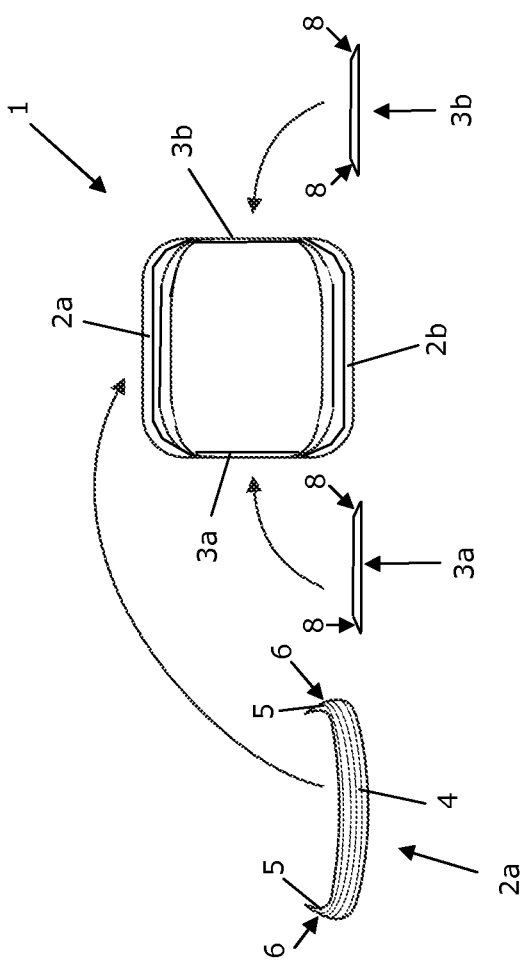
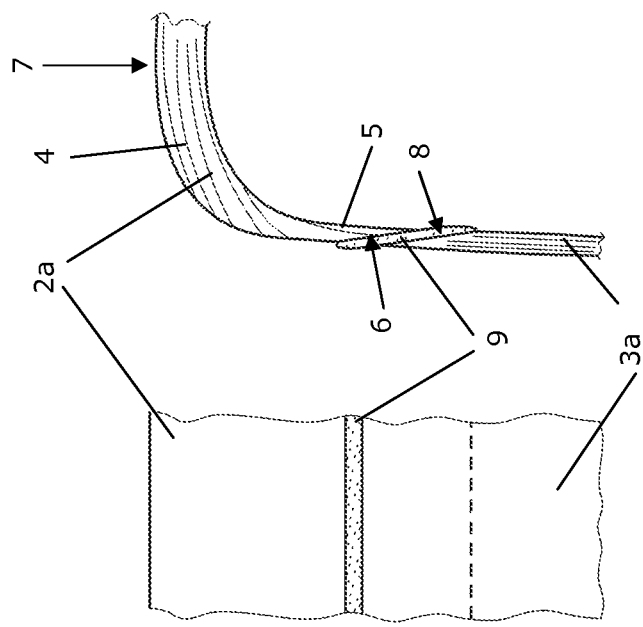
Fig. 1a
Fig. 1b

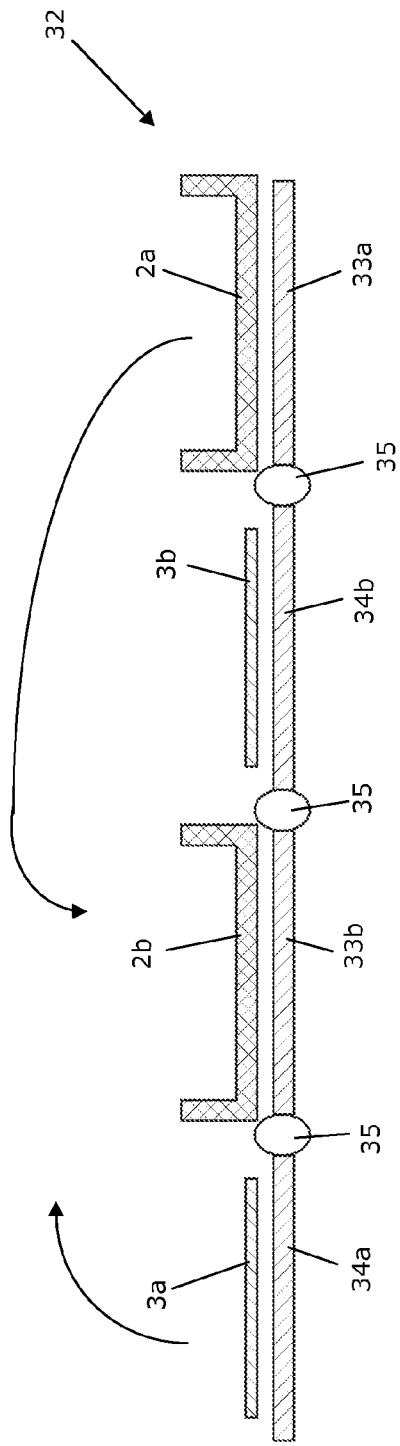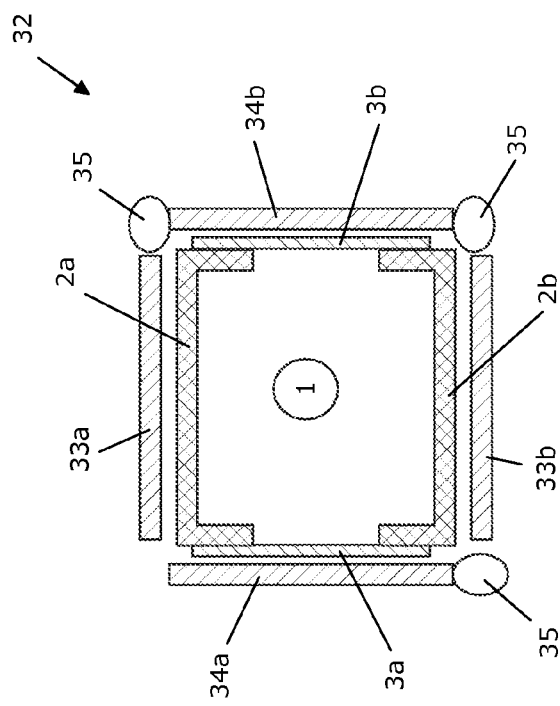
Fig. 9a
Fig. 9b

METHOD OF MANUFACTURING A SPAR FOR A WIND TURBINE FROM ELEMENTS COMPRISING DIFFERENT MATERIALS

TECHNICAL FIELD

The present invention relates to a method of manufacturing a spar for a wind turbine and to the spar itself.

BACKGROUND OF THE INVENTION

Traditionally a spar acts as a reinforcing beam in a wind turbine blade. The spar is located between two shell parts, one defining a windward side shell part and the other one defining a leeward side shell part. The spar is located in the cavity between the two wind turbine shell parts and extends substantially throughout the shell cavity in order to increase the strength of the wind turbine blade.

In order to increase the strength of the spar and in order to limit the weight hereof, composite materials are often used for spars to be used in wind turbine blades, since such blades are exposed to varying loads with high peeks.

Traditionally, a spar is a tubular element being manufactured by the use of a male mould, e.g. by winding a suitable material around a mandrel or a similar core element.

When winding or by other means applying a material onto a mandrel or a core, the inner geometry of the final tubular element is defined by the geometry of the mandrel or core, thus allowing for a well-defined inner geometry. On the contrary, the outer geometry of the final tubular element is less well-defined as the effect of even small variations on the mandrel or core and/or small variation on the innermost layers of the winded material are increased with the number of windings.

Alternatively, a spar is sometimes made from two separately moulded elements which subsequently are joined in order to define a tubular element. In order to achieve a tubular element of the right size, a height adjustment element can be applied to assure that the final spar fits in the cavity between the two shell parts defining the wind turbine blade.

SUMMARY OF THE INVENTION

It is an object of embodiments of the present invention to provide an improved method of manufacturing a spar for a wind turbine blade and to provide an improved spar.

Thus, in a first aspect, the invention provides a method of manufacturing a spar for a wind turbine blade, the method comprising the steps of:
   providing at least two caps, each cap forming an intermediate portion between two end portions, where the end portions each forms a cap joint surface portion along a longitudinal extending edge of the end portion and the intermediate portion forms an outer surface portion of the spar,
   providing at least two webs, each web being provided with web joint surface portions along opposite and longitudinally extending edges, and
   connecting the joint surface portions of the caps with the joint surface portions of the webs to form a tubular configuration of the spar,
wherein the intermediate portions and the end portions are provided so that they comprise different materials.

The at least four spar parts, the caps and the webs, are connected to form a tubular element which may constitute part of the longitudinal strength of the wind turbine blade, thus being part of the reinforcement of the blade.

It should be understood, that by tubular element is in this connection meant a hollow element with an elongated shape. The shape may be non-uniform. The outer geometry may be of a substantially rectangular shape, a partly circular shape, an oval shape or any other shape. The inner geometry may be different from the outer shape, thus defining a tubular element in the form of an elongated ring of an arbitrary shape.

In a cross section the spar may be substantially rectangular, e.g. with rounded corners. The area of the cross section may decrease from the root end to the tip end along the length of the spar to have a spar which fits a wind turbine blade having a decreased size at the tip end compared to the root end. However, the width of the spar may increase locally to increase strength and stiffness of the spar locally. In a preferred embodiment, the spar may thus be approximately conical, i.e. may have a base which is substantially circular transforming into an approximately rectangular shape with rounded corners and with sides which taper towards each other.

As an example, the spar may have a length of approximately 45 meters, a maximum width of approximately 1.0 meters, and a maximum height of approximately 0.8 meters. Compared hereto the minimal width of the spar may be approximately 100 millimeters. It should be understood that this is only one example of a spar. Other spars being both smaller and larger may also be used depending of the wind turbine blade to be manufactured.

The at least two spar caps may form an upper and a lower part of a spar being substantially rectangular, whereas the webs may form substantially vertical connections here between when connected at the joint surface portions. Thereby providing a spar of at least four separate elements, which may be connected to form a spar with a well-defined outer geometry ensuring a better match between the blade shells and the spar.

The intermediate portions and the end portions are provided so that they comprise different materials. In one embodiment, the intermediate portions mainly comprises carbon fibre reinforced plastic. Whereas the end portions may mainly comprise glass fibre reinforced plastic.

The most commonly used materials for the intermediate portion may be unidirectional fibres and a resin matrix. A filler may also be added. The fibres may e.g. be carbon, glass, wood or natural fibres. As an example, the resin may be a thermoset resin, such as Epoxy, or it may be a thermoplastic resin, such as PET (Polyethylene Terephtalate). An example of a suitable filler is Nano particles.

The most commonly used material for the end portions may be biaxially fibres and a resin matrix. The fibre may e.g. be of glass or wood. And as an example, the resin may be a thermoset resin, such as Epoxy, or it may be a thermoplastic resin, such as PET.

The materials may be selected so that the intermediate portions and the end portions have different characteristics with respect to strength. Thereby is may be obtained that the intermediate portions and the end portions have different ability support a load, and/or have different levels of stress at which there is a significant change in the state of the material, stress being at least one of tensile stress, compressive stress, or shear stress.

Furthermore, the materials may be selected so that the intermediate portions and the end portions have different characteristics with respect to flexibility. Thereby the intermediate portions and the end portions may have different property of being flexible, i.e. different level of how easily they are bent or shaped. In other words, the materials may be different in relation to the extent to which and the rate at which adjustments to changed circumstances are possible.

A transition zone may be provided between the intermediate portion and the end portions. This transition zone may be provided with a gradually changed composition of the different materials which the intermediate portion and the end portions comprise. Thus, in the transition zone the resin may change gradually, the fibres may change gradually, or both may change gradually. Other materials of the intermediate portion and the end portion may also change gradually.

In one embodiment, at least one of the caps is moulded in a cap mould, whereby the joint surface portions of the cap are shaped by contact with the cap mould during moulding thereof. By shaping the cap joint surface portions by contact with the mould, these portions can be especially well designed for connection with the joint surfaces of the webs, as the cap joint surfaces portions may have a surface structure being optimized for e.g. an appropriate adhesive and/or a shape which accurately matches a corresponding web joint surface.

The caps may form an outer surface of the tubular spar, which outer surface is geometrically defined by contact with the cap mould during moulding thereof. Consequently, not only the cap joint surfaces may be defined by contact with the mould, also the outer surface of the intermediate portion may be defined by the mould.

Furthermore, each web may be moulded in a web mould, and the joint surface portions of the webs may be geometrically defined by contact with the web mould during moulding thereof. Alternatively, the webs may be substantially plain sheets of a non-moulded material, such as plastic or wood.

If moulded, the webs may form an inner surface of the tubular spar, which inner surface is geometrically defined by contact with the web mould during moulding thereof.

The caps may be provided so that the end portions hereof extend transverse to the intermediate portion. In one embodiment, the end portions extend from the intermediate portion at an angle of 75-100 degrees, such as approximately 90 degrees, thus forming a cap being U-shaped along the length of the assembled spar.

Caps having end portions extending transverse to the intermediate portion may ensure a good bond between the end portions of the caps and the webs. Furthermore, this configuration may facilitate distribution of the shear forces, as the bond between the cap and the web will be loaded in shear.

A bend portion may connect the intermediate portion and each of the end portions. In the bend portion, the caps may have a larger curvature so that each of the end portions extends transverse to the intermediate portion with an angle being within a predefined range, such as a range of 75-100 degrees.

The method may comprise a step of arranging the caps relative to each other so that the end portions of one cap extend from the intermediate portion towards the end portions of another cap. Thereby, the web joint surface portions may be connected to the cap joint surface portions by arranging the webs so that they extend between the end portions of the caps with the web joint surface portions overlapping the cap joint surface portions, thus forming a spar being tubular.

The caps may be arranged relative to each other so that a predefined distance is formed between the outer surface portions of the caps prior to the step of connecting the joint surface portions of the caps with the joint surface portions of the webs. This allows for assembling of a spar having a well-defined height, and thus a spar matching the size and shape of the blade shells more precisely.

The webs may be provided as substantially flat panels to facilitate connection of the joint surface portions of the caps and webs. This may especially be an advantage if the caps are arranged relative to each other so that the end portions of one cap extend from the intermediate portion towards the end portions of another cap.

The caps may be provided so that an angle existing between the end portions and the intermediate portion may vary under elastic deformation of the caps. The angle may be an angle above 90 degrees. As the joint surface portions of the webs may be connected to the cap joint surface portions by arranging the webs so that they extend between the end portions of the caps with the web joint surface portions overlapping the cap joint surface portions, the webs may be pressed towards the caps during assembling of the spar. When pressing the webs towards the caps, the caps may be deformed, as the end portions of each of the caps may be pressed towards each other whereby the angle may change towards an angle of approximately 90 degrees.

The caps and webs may be provided so that the comprise different materials. As an example, both the caps and the webs may comprise fibre reinforced plastic, where the fibres of the caps may mainly be carbon fibres and the fibres of the webs may mainly be glass. The resin may be the same for both, or may be different forms of resin. Other materials may also be used, either as an alternative to or in combination with the fibre reinforced plastic.

The webs may be provided as sandwich constructions having a core comprising e.g. a thermoplastic or thermoset foam or balsa. Other core materials may also be used. The webs may comprise an inner and an outer layer on each side of the core, which layers as an example may primarily comprise biaxially fibres and a resin matrix. The fibres may e.g. be glass fibres and the resin may e.g. be a thermoset resin, such as Epoxy, or it may be a thermoplastic resin, such as PET.

The caps and webs may be provided with different structures, e.g. either due to the use of different materials or due to the used of unidirectional and biaxially fibres, respectively.

The webs and caps may be provided as laminated elements by moulding of at least one type of fibre material and at least one type of resin in individual moulds. Each of the caps may be moulded as a single piece to avoid assembling of the caps of a plurality of cap elements. However, assembling of cap elements may be a step in one embodiment of the method.

As the windward side shell and the leeward side shell of the turbine blade may curve slightly differently, the at least two individual moulds for the caps may be differently shaped.

Likewise, individual moulds may be used to provide the webs. The webs in one embodiment may be provided of a plurality of web elements, each web element being moulded in a separate mould. As an example, each web may comprise a plurality of web element with a length in the range of 5-15 meters, such as 10 meters per element. The web elements may be of different length. It should be understood, that a web may alternatively comprise a number of substantially plain web elements of a non-moulded material.

Consequently, the method may further comprise a step of assembling the webs from a plurality of web elements. The webs may be assembled from the web elements before connecting the caps and webs to form the spar, or alternatively, the web elements may be connected while simultaneously connecting the caps and web and thus forming the spar.

The web joints, i.e. joints between two adjacent web elements, may be staggered along the length of the assembled spar to avoid that web joints on opposite sides of the spar are positioned vis-á-vis each other.

To form a spar by connecting the caps and webs, the method may further comprise a step of applying an adhesive to at least one of the joint surface portions and a step of curing said adhesive. The adhesive may be cured by use of heating.

To be able to position the caps and webs relative to each other before connecting them, it may be an advantage if the caps and webs comprise an assembly marking, as such a marking may facilitate positioning of the caps and webs relative to each other. The markings may be provided during moulding of the caps and webs, as the moulds as an example may comprise one or more datums, e.g. in the form of small protrusions forming an indentation in the caps and webs during moulding hereof.

To facilitate connection of the spars and the webs, the method may further comprise a step of providing an assembly tool, and a step of arranging the caps and webs herein prior to the step of connecting the caps and webs.

The assembly tool may comprise a support and consequently, the step of arranging the caps and webs in the assembly tool may comprise a step of arranging them in this support so that the caps and webs are positioned in a specific position relative to each other, thereby facilitating correct positioning of the spars and webs before connecting them.

When positioning the spar between two shell parts of a wind turbine blade, the outer surface portion may form a contact face for assembly with a blade shell. The spar may be attached to the shell part by adding an adhesive to the outer surface portion of each of the caps and subsequently position the shell parts around the spar so that a part of an inner surface of the each of the shell parts is attached to the outer surface portion of each of the caps.

In an alternative embodiment, the outer surface portion may be adapted to form part of an aerodynamically active surface of a wind turbine blade. Thus, the spar may not be completely encapsulated within the shell parts.

The spar may comprise more elements than the caps and webs. In one embodiment, the spar further comprises a separate root section. Thus, the method may further comprise a step of attaching the root section which is formed as a separate section to the caps and webs. The root section may be attached during connection of the joint surfaces of the caps and webs, or it may be attached subsequently. The root section may be attached by different processes, such as by bonding, wrapping, or infusion.

The method may further comprise a step of providing in a root end of the spar, a plurality of attachments structures facilitating attachment of the blade to a hub. The root end may form part of a separate root section or it may form part of a spar being assembled from caps and webs without a separate root section. An attachment structure may as an example comprise a hollow steel member with an internal threading into which a bolt or another threaded member may be fixed.

To facilitate lightning protection of the wind turbine blade, the method may further comprise a step of providing a short circuit in each of the caps. The short circuits may connect the caps electrically. The short circuit may as an example be thin copper plates which are connected to each other and to a down conductor. The short circuits may be laminated into the caps.

To increase the stability of the spar, the method may further comprise a step of attaching a stiffening element to at least one of the caps, the stiffening element being arranged to increase a stiffness of the spar in the longitudinal direction. The stiffening element may be attached e.g. during moulding of the caps or during assembling of the spar when connecting the joint surface portions of the caps and webs.

Examples of stiffening elements are a transverse member being attached to and extending from an inner surface of one cap to the inner surface of another cap, and different elongated members being attached to an inner surface of the caps and extending along the caps. Another example of a stiffening element is a rib member comprising of a plurality of ribs being attached to an inner surface of the caps. The ribs can be positioned adjacent to each other with a mutual distance of e.g. 1 meter. Other stiffening members may also be used.

In a second aspect, the invention provides a spar for a wind turbine blade, the spar having a tubular structure and being assembled from at least two caps and two webs, the caps each forming an intermediate portion between two end portions, where the end portions each forms a cap joint surface portion along a longitudinal extending edge of the end portion and the intermediate portion forms an outer surface portion of the spar, and the webs each having web joint surface portions along opposite and longitudinally extending edges, where the joint surface portions of the caps are connected to the joint surface portions of the webs, and where the intermediate portions and the end portions comprise different materials.

The spar may be manufactured by use of the method of the first aspect of the invention. It should be understood, that the features of the above-mentioned first aspect of the invention may also be applicable to the spar of the second aspect of the invention.

In particular the spar may comprise:
intermediate portions comprising carbon fibre reinforced plastic,
end portions comprising glass fibre reinforced plastic,
intermediate portions and end portions have different characteristics with respect to strength or flexibility,
a transition zone between the intermediate portion and the end portions, the transition zone comprising a gradually changed composition of the two materials,
joint surface portions of the caps being shaped by contact with a cap mould,
end portions extending transversely to the intermediate portion,
a web comprising a plurality of web elements,
a short circuit in each of the caps, the short circuits connecting the caps electrically to facilitate lightning protection of the blade, and/or
a stiffening element attached to at least one of the caps, the stiffening element being arranged to increase a stiffness of the spar in the longitudinal direction.

In a third aspect, the invention provides a spar for a wind turbine blade, the spar having a tubular structure and being assembled from at least two caps and two webs, the caps each forming an intermediate portion between two end portions, where the end portions each forms a cap joint surface portion along a longitudinal extending edge of the end portion and the intermediate portion forms an outer surface portion of the spar, and the webs each having web joint surface portions along opposite and longitudinally extending edges, where the joint surface portions of the caps are connected to the joint surface portions of the webs, wherein at least one of the webs comprises at least two adjacent web elements with interfaces not being connected to each other.

This means, that these adjacent web element are not directly connected to each other but only connected to each other via the caps to which they are both joined. Consequently, they are not bonded, glued, screwed or similarly attached to each other.

The spar may be manufactured by use of the method of the first aspect of the invention. It should be understood, that the features of the above-mentioned first and second aspects of the invention may also be applicable to the spar of the third aspect of the invention.

In a fourth aspect, the invention provides a blade for a wind turbine comprising a spar according to the second or third aspect of the invention. The spar may be manufactured according to the first aspect of the invention. It should be understood, that the features of the first, second, and third aspects previously described may also be applicable to the fourth aspect of the invention.

When connecting the joint surface portions of the caps and webs to form a spar, an assembly tool may be used. An example of such an assembly tool could be:

An assembly tool for assembling a spar for a wind turbine blade, the spar comprising at least two caps and two webs, each cap forming an intermediate portion between two end portions, where the end portions each forms a cap joint surface portion along a longitudinal edge of the end portion and the intermediate portion forms an outer surface portion of the spar, and each web having web joint surface portions along opposite and longitudinally extending edges, the tool comprising a cap support for holding caps, a web support for holding webs and an assembly structure facilitating positioning of the supports relative to each other.

By positioning the caps and webs relative to each other it may be further be ensured that the geometry of the spar is more precisely adapted to the geometry of the final turbine blade.

The assembly structure may comprise a hinge structure facilitating rotation of one support relative to an adjacent support. Thus, the supports may be connected to each other by a hinge structure which upon rotation of one support relative to an adjacent support facilitates positioning of the supports relative to each other.

In an initial open configuration, in which the assembly tool may be ready to receive the caps and webs, the supports may all be positioned with an upper support surface facing upwards. After having positioned the caps and webs in the supports, the assembly structure may facilitate that three of the four support structures are lifted and rotated relative to each other and relative to the last support structure which may stay in its initial position having the upper support surface facing upwards. The lifting and rotational movement may be controlled and limited by the hinge structure of the assembly structure which facilitates correct rotation of the supports relative to each other.

As an alternative to the hinge structure, the assembly structure may comprise an attachment structure facilitating attachment of at least one support to at least another support. The supports may still in an initial position be positioned with the upper support surface facing upwards. And after having positioned the caps and webs in the supports, each of the supports may be moved to the correct position where the attachment structure may ensure that a support is attached to at least one of the adjacent supports to form a tubular spar.

To facilitate positioning of the supports relative to each other, the assembly structure may comprise a power driven element for positioning the supports relative to each other. The power driven element may comprise a hydraulic structure, an electrical structure, a crane device, or other power structures.

At least one of the supports may comprise a tool marking which matches a corresponding assembly marking on at least a cap or a web. These markings may facilitate positioning of the cap or web relative to the support, thereby ensuring a correct final position of caps and webs relative to each other before connecting them.

In one embodiment, the tool marking comprises one or more protrusions and the corresponding assembly marking comprises one or more indentations. These protrusions are arranged for engagement with the indentations of the cap or web. In an alternative embodiment, the assembly marking comprises one or more protrusions, whereas the tool marking comprises one or more indentations. Other corresponding markings facilitating positioning of the caps or web relative to the assembly tool may be used in other embodiments.

To ensure that a cap or web stays within a support structure as long as necessary, the supports may comprise a fixing structure facilitating fixing of a cap or a web to each of the supports. A fixing structure may be provided for each of the support structures. The cap and/or web may be fixed e.g. by magnetic forces, by the use of suction pressure, by bonding, by screws, rivets, or by other means.

As the manufactured caps and/or webs may have a degree of longitudinal bending due to thermal shrinkages, it may be an advantage if the assembly tool further comprises a manipulation structure adapted to manipulate part curvature and twist of at least one of the caps and webs. Thereby, the required tolerances may be met. By part curvature is in this connection understood the longitudinal bending of at least a part of the caps and/or webs. Furthermore, twist should be understood to cover a partly rotation of a part of the caps and/or webs.

The assembly tool may further comprise a heating structure facilitating curing of an adhesive provided at least one of the joint surface portions. As an example, the heating structure may comprise electrically heated wires being built-in the supports at positions at which the joint surface portions are positioned during assembling of the spar.

BRIEF DESCRIPTION OF THE DRAWINGS

Embodiments of the invention will now be further described with reference to the drawings, in which:

FIG. 1b is illustrates an embodiment of a spar having a tubular structure and being assembled form at least two caps and two webs, FIG. 1b is an enlarged view of FIG. 1a is illustrating a joint between a cap and a web, FIGS. 9a and 9b illustrate an assembly tool for a spar.

DETAILED DESCRIPTION OF THE DRAWINGS

Figure 2A:
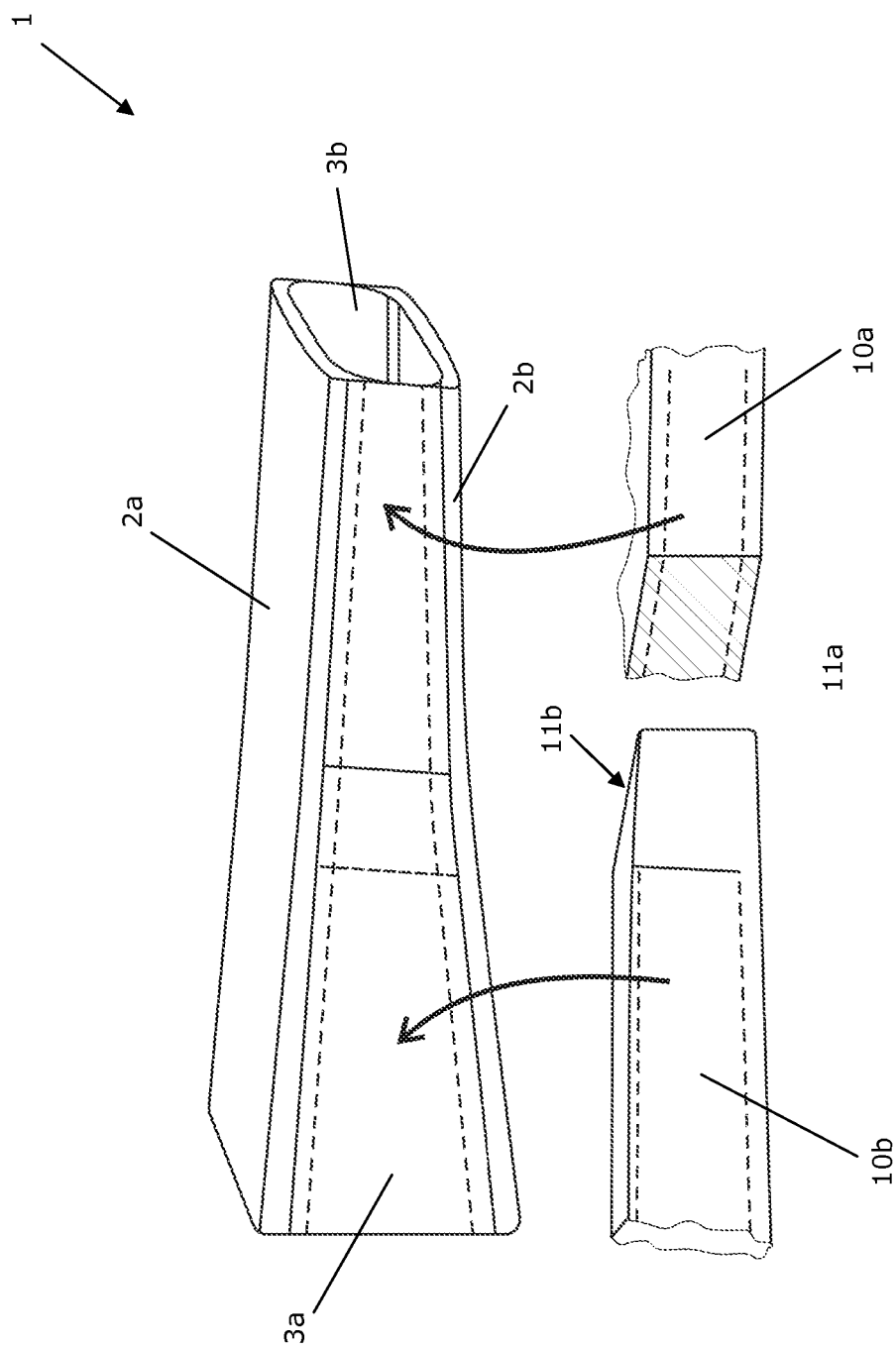
FIGS. 2a and 2b illustrate different embodiments of a spar comprising a plurality of web elements.

FIG. 1a is illustrates an embodiment of a spar 1 for a wind turbine blade (not shown). The spar 1 comprises two caps 2a, 2b and two webs 3a, 3b.

Each cap 2a, 2b forms an intermediate portion 4 between two end portions 5. The end portions 5 each forms a cap joint surface portion 6 and the intermediate portion 4 forms an outer surface portion 7.

Each web 3a, 3b is provided with web joint surface portions 8 along opposite and longitudinally extending edges.

When connecting the joint surface portions of the caps 6 with the joint surface portions of the webs 8, a spar 1 having a tubular configuration is formed. An adhesive 9 is used to bond the joint surface portions 6, 8 together as illustrated in FIG. 1b which shows an enlarged part of FIG. 1a.

The caps 2a, 2b and webs 3a, 3b are moulded in cap moulds and web moulds, and their joint surface portions 6, 8 are geometrically defined by a shape of these moulds. I.e. the joint surface portion 6, 8 are shaped by contact with the mould ensuring a well-defined geometry of the joint surface portions 6, 8.

As illustrated, the end portions 5 of the caps 2a, 2b extend transversely to the intermediate portion 4 at an angle of approximately 90 degrees, whereby the end portions 5 of the one cap 2a extend from the intermediate portion 4 towards the end portions 5 of the other cap 2b when the spar 1 is assembled. The webs 3a, 3b are attached to the caps 2a, 2b at the end portions 5.

FIG. 2a illustrates parts of an embodiment of a spar 1 in which the webs 3a, 3b comprise a plurality of web element 10a, 10b. To avoid a butt joint between the web elements 10a, 10b, each of the web elements 10a, 10b comprises a joint surface 11a, 11b ending at an acute angle. This increases the area of the joint surfaces 11a, 11b and facilitates joining of the web elements 10a, 10b.

Figure 2B:
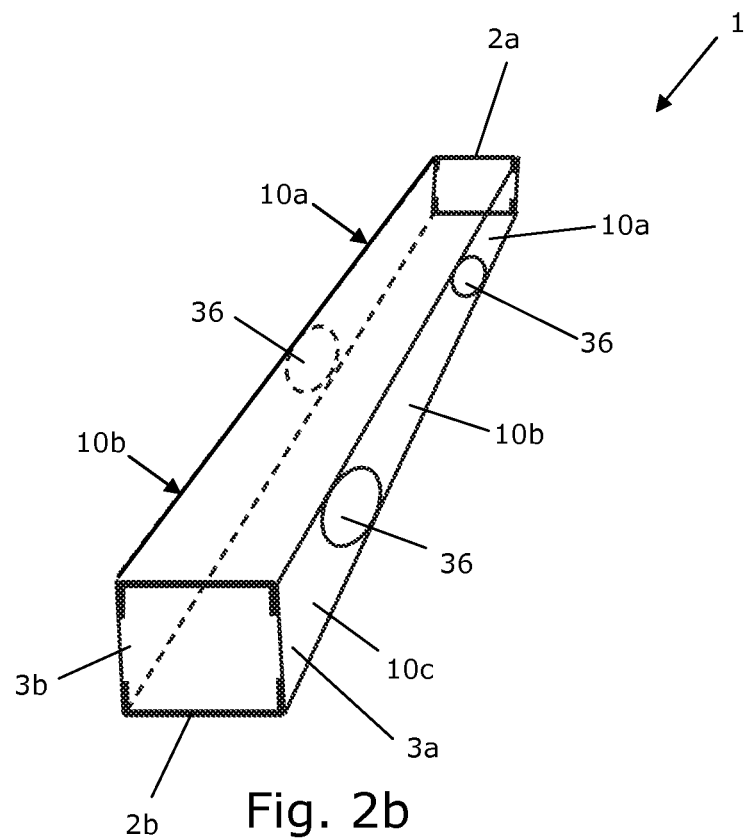
Figure 2C:
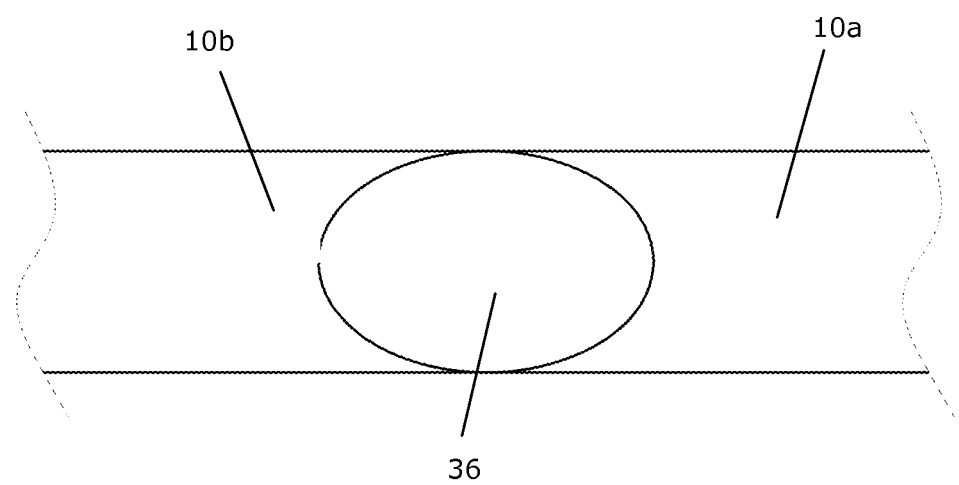
FIG. 2c is an enlarged view of a part of FIG. 2b.

FIGS. 2b and 2c illustrate an alternative embodiment of a spar 1 in which the webs 3a, 3b comprise a plurality of web element 10a, 10b, 10c. Instead of the overlap joint illustrated in FIG. 2a, the web elements 10a, 10b are joined at their end sections forming, in this embodiment, an elliptical cut-out leaving a hole 36 in the webs 3a, 3b. In the cut-out area 36, the shear loads are taken by the caps 2a, 2b.

FIG. 2b further illustrates that the web joints, i.e. the joints between two adjacent web elements 10a, 10b, and 10b, 10c are staggered along the length of the assembled spar 1 to avoid that web joints on opposite sides of the spar 1 are positioned vis-á-vis each other. This way of staggering the web joints is also applicable for the web joints of FIG. 2a.

Figure 2D:
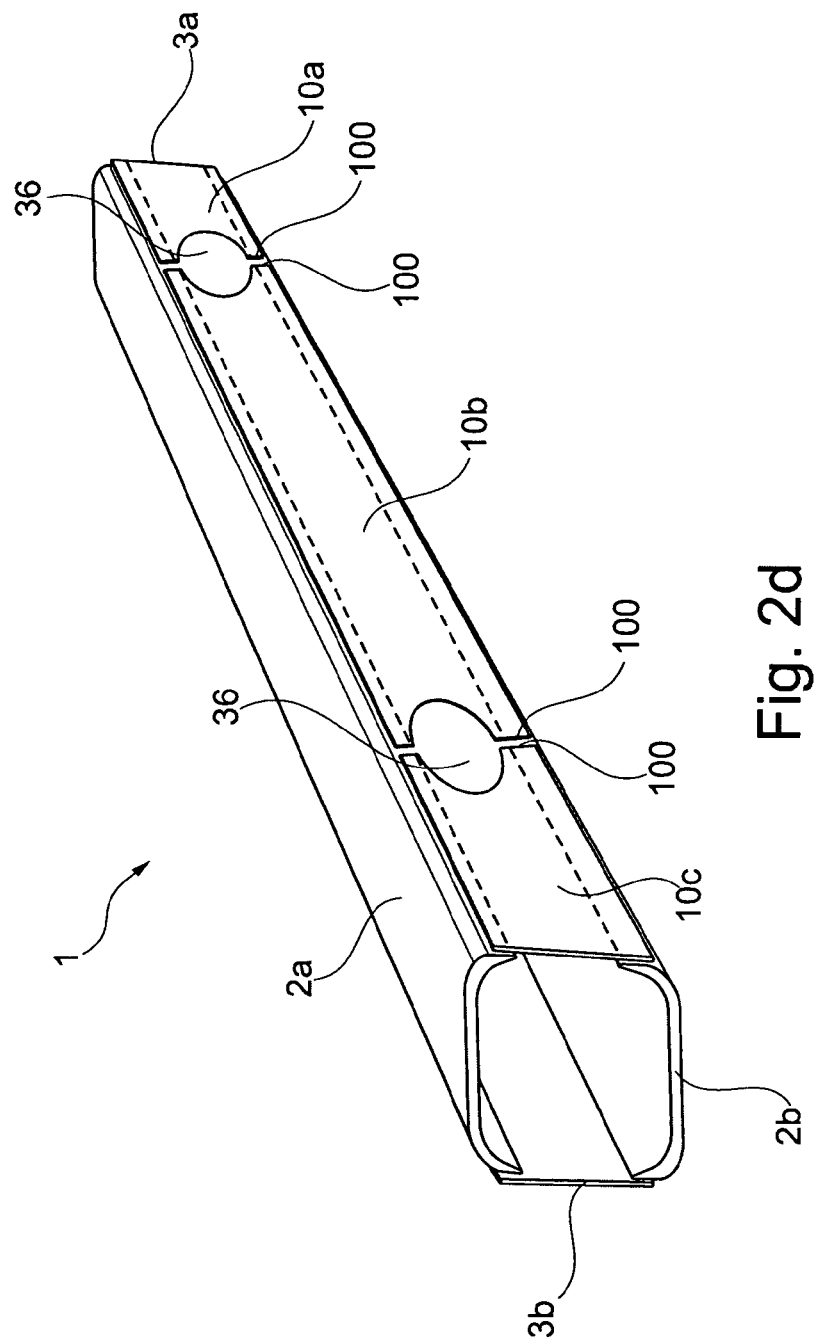
FIG. 2d illustrates an embodiment of a spar comprising a plurality of web elements.

FIG. 2d illustrates a further alternative of an embodiment of a spar 1 in which the webs 3a, 3b comprise a plurality of web element 10a, 10b, 10c. As illustrated, two adjacent web elements 10a, 10b-10b, 10c have interfaces 100 which are not connected to each other.

This means, that these adjacent web elements 10a, 10b-10b, 10c are not directly connected to each other but only connected to each other via the caps 2a, 2b to which they are both joined. Consequently, the adjacent web elements 10a, 10b-10b, 10c are not bonded, glued, screwed or similarly attached to each other.

When not connecting the web elements 10a, 10b-10b, 10c only bonding of the caps 2a, 2b and webs 3a, 3b is needed and extra bonding for the web elements can be omitted. This may both decrease the amount of adhesive needed when assembling the spar 1 and the time involved in assembling the spar, and thus lower the costs associated herewith. The holes 36 can be used for inspection access and are shaped so that they minimize stress concentrations on the end of the web elements.

Figure 3A:
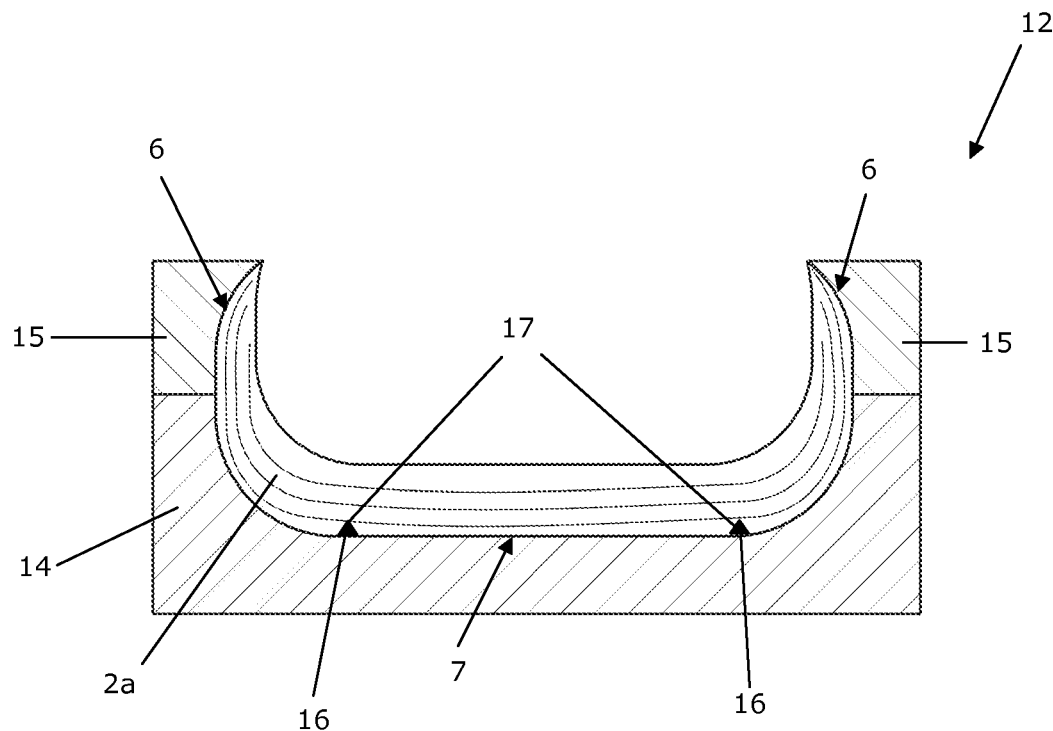
FIG. 3a illustrates a spar mould for a cap.
Figure 3B:
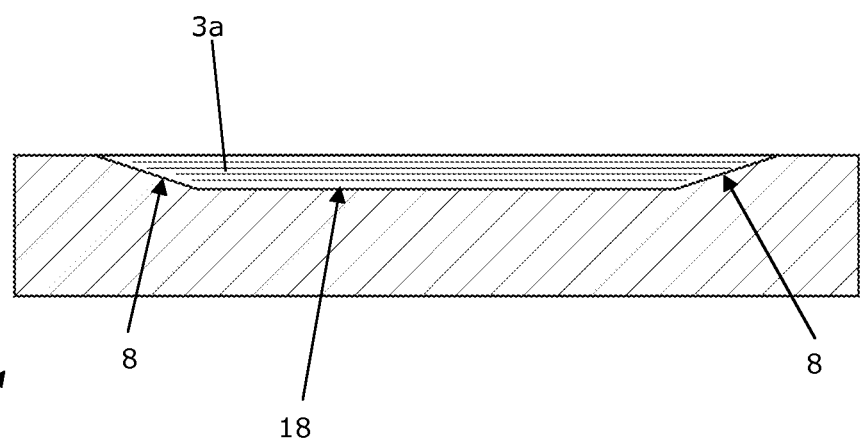
FIG. 3b illustrates a web mould for a web.

FIG. 3a illustrates an embodiment of a cap mould 12 with a cap 2a, and FIG. 3b illustrates an embodiment of a web mould 13 with a web 3a.

The cap mould 12 comprises a lower mould 14 and two upper mould extensions 15. The inner surface of the upper mould extensions 15 is provided with a material with does not adhere to the resin of the cap 2a and which furthermore is able to geometrically define the cap surface joint portions 6 by contact herewith. An example of such a material is peal ply.

The outer surface portion 7 of the intermediate portion 4 is also defined by contact with the inner surface of the cap mould 12.

The inner surface of the cap mould 12 comprises two datums 16 in the form of small protrusions, a little cone. The datums 16 each forms an indentation 17 in the cap 2a during moulding hereof. These indentations 17 are used to position the cap 2a relative to the webs 3a, 3b (not shown) before connecting them. The positioning can be done by use of an assembly tool.

As illustrated in FIG. 3b, the inner surface 18 and the web joint surface portions 8 of the web 3a are defined by contact with the web mould 13, thus allowing for a well-define geometry of the web joint surface portions 8 which are to be joined with the cap surface portions 5. I.e. the matching joint surfaces portions 6, 8 are moulded to facilitate a more precise joint between the caps 2a, 2b and webs 3a, 3b.

Figure 4A:
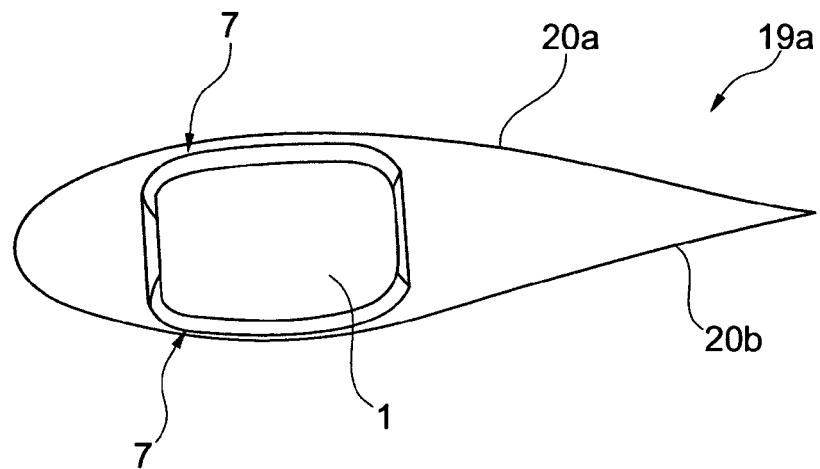
FIGS. 4a and 4b illustrate two different ways of attaching the spar to wind turbine blade shells.
Figure 4B:
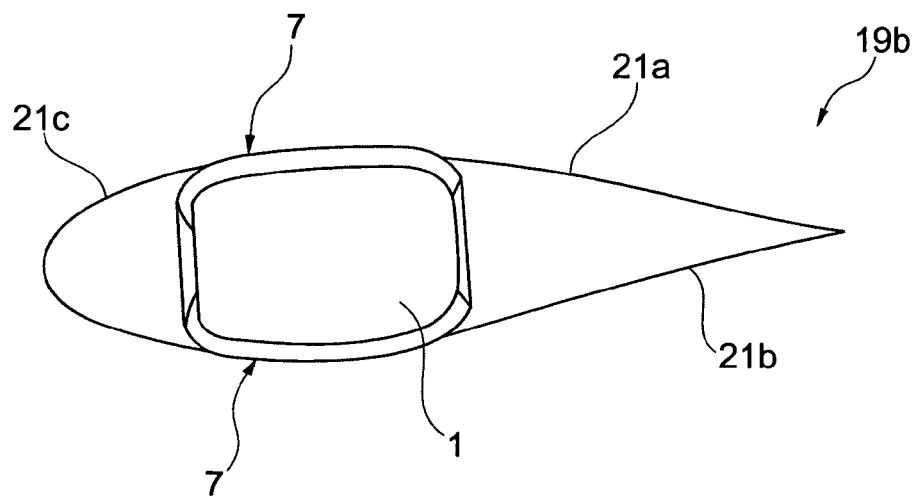

FIGS. 4a and 4b illustrate two different ways of attaching the spar 1 to the shells of a wind turbine blade 19.

In FIG. 4a the spar 1 is positioned between two blade shells 20a, 20b of the wind turbine blade 19a. The outer surface portions 7 form a contact face for assembly with the blade shells 20a, 20b. The spar 1 is attached to the blade shells 20a, 20b by adding an adhesive (not shown) to the outer surface portion 7 of each of the caps 2a, 2b.

In FIG. 4b an alternative embodiment is illustrated. The outer surface portions 7 are adapted to form part of the aerodynamically active surface of the wind turbine blade 19b. Thus, the spar 1 is not completely encapsulated within the blade shells 21a, 21b, 21c.

Figure 5:
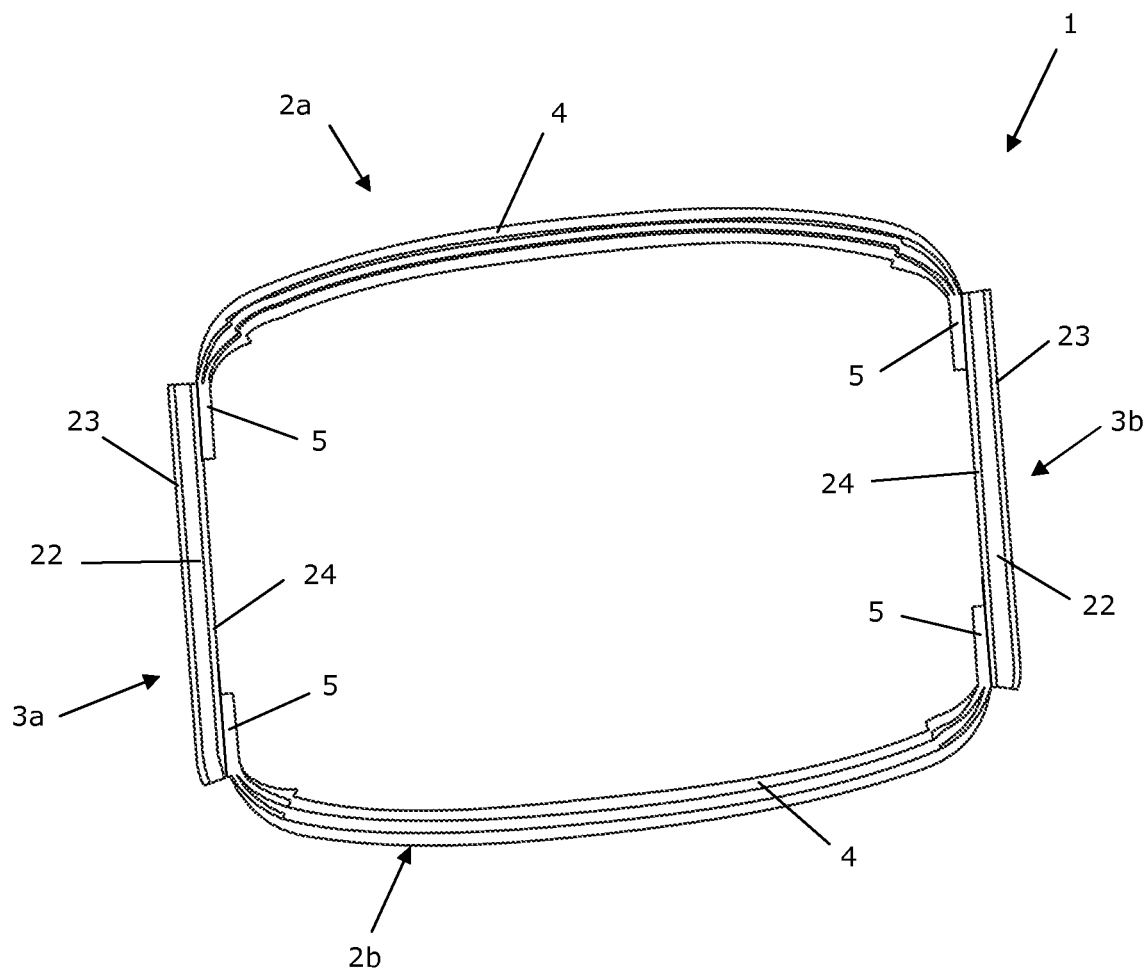
FIG. 5 illustrates a spar comprising intermediate portions and end portions of different materials, and webs comprising sandwich constructions.

FIG. 5 illustrates a spar 1 comprising two caps 2a, 2b and two webs 3a, 3b. The caps 2a, 2b comprise intermediate portions 4 and end portions 5 of different materials. And the webs 3a, 3b are provided as sandwich constructions.

In the illustrated embodiment, the intermediate portions 4 comprise unidirectional fibres, a resin matrix, and a filler. The main part of the fibres is carbon fibres. The end portions 5 comprise biaxially fibres and a resin matrix. The main part of the fibres is glass fibres.

The webs 3a, 3b are provided as sandwich constructions having a core 22 comprising a foam. The webs 3a, 3b further comprise an outer 23 and an inner layer 24 on each side of the core 22. These layers 23, 24 primarily comprise biaxially fibres, in the form of glass fibres, and a resin matrix.

FIGS. 6a-6d illustrate different embodiments of a spar 1 comprising different forms of stiffening elements 25 to increase the stability of the spar 1. The stiffening element 25 is attached to at least one of the caps 2a, 2b.

Figure 6A:
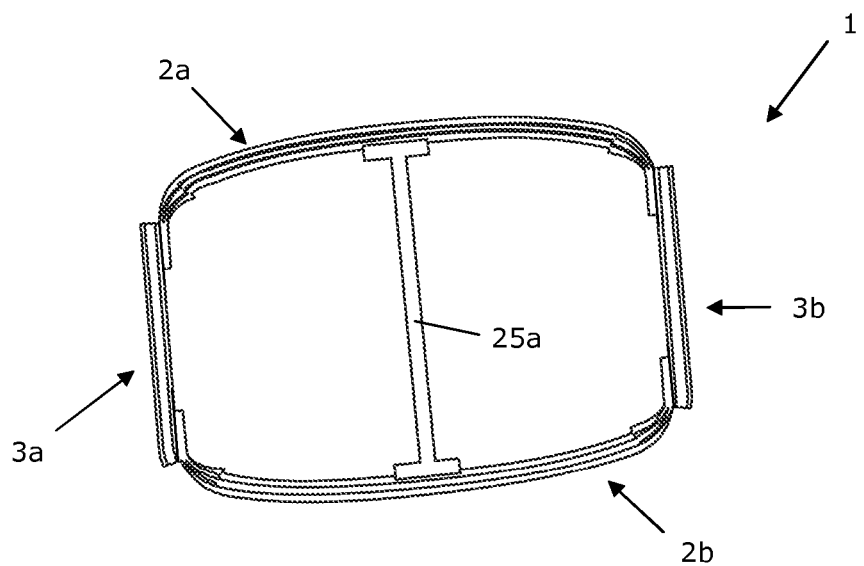
FIGS. 6a-6d illustrate different embodiments of a spar comprising different stiffening elements.

FIG. 6a illustrates a stiffening element 25a in the form of a transverse member being attached to and extending from the inner surface of the upper cap 2a to the inner surface of the lower cap 2b.

Figure 6B:
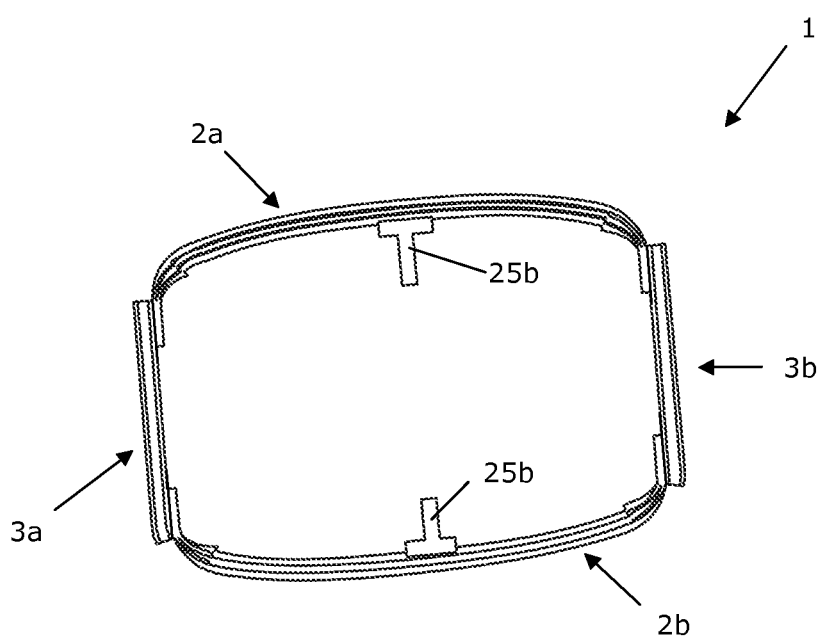

FIG. 6b illustrates a stiffening element 25b in the form of two elongated members each being attached to the inner surface of one of the caps 2a, 2b and extending along the caps 2a, 2b. The stiffening element 25b is formed as a T-beam.

Figure 6C:
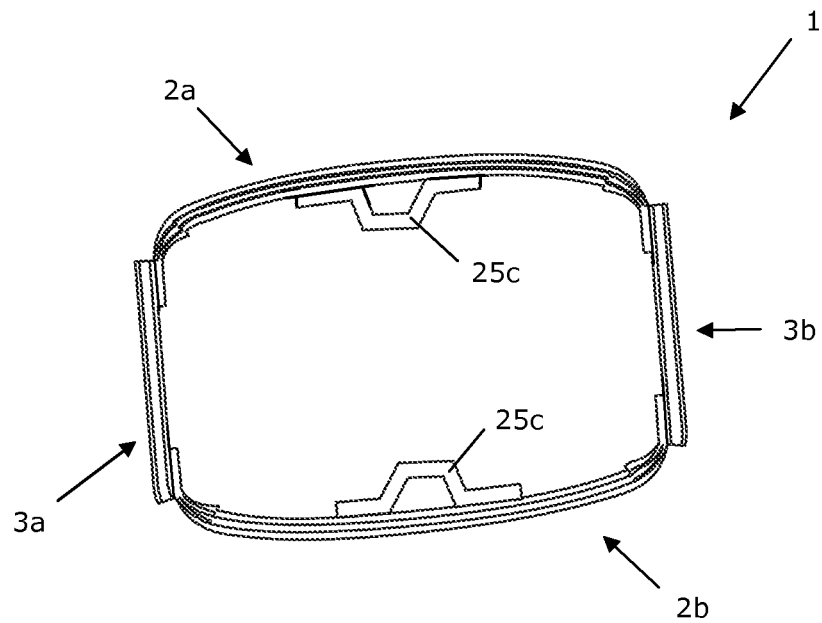

FIG. 6c illustrates a stiffening element 25c in the form of two elongated members each being attached to the inner surface of one of the caps 2a, 2b and extending along the caps 2a, 2b. The stiffening element 25b is formed as an Omega shaped beam.

Figure 6D:
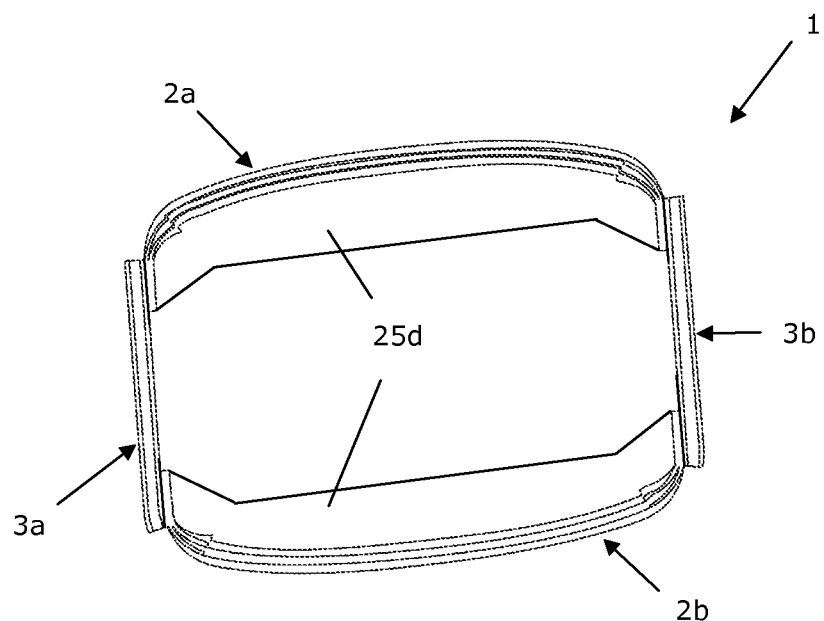

FIG. 6d illustrates a stiffening element 25d in the form of a rib member comprising of a plurality of ribs. The ribs are attached to the inner surface of the caps 2a, 2b and positioned adjacent to each other with a mutual distance of approximately 1 meter.

Figure 7A:
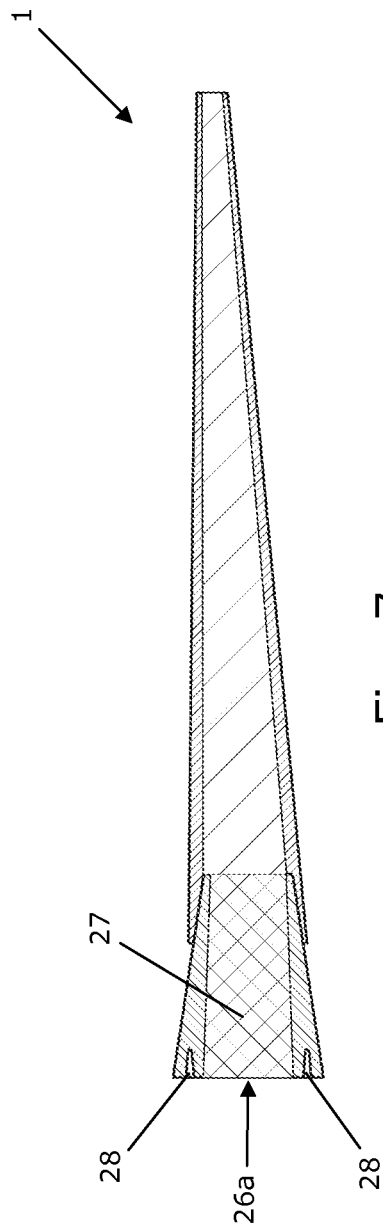
FIGS. 7a and 7b illustrate different embodiments of a spar with different root ends.
Figure 7B:
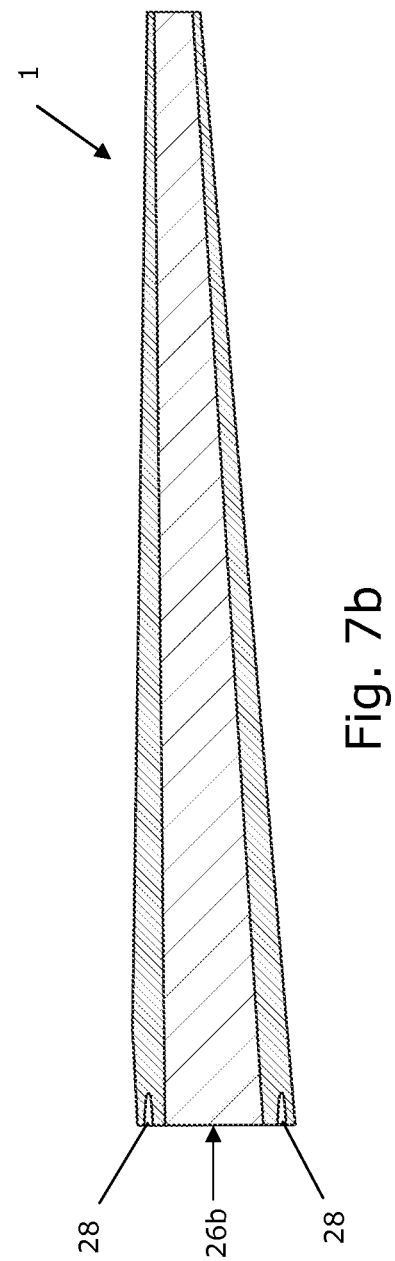

FIGS. 7a and 7b illustrate different embodiments of a spar 1 having with different root ends 26.

FIG. 7a illustrates an embodiment of a spar comprising a separate root section 27. The root section 27 has been attached by bonding, wrapping, or infusion.

A plurality of attachments structures 28 facilitating attachment of the blade (not shown) to a hub (not shown) are provided in the root end 26 of the spar 1. In FIG. 7a, the attachment structures 28 are provided in the root end 26 of the separate root section 27, whereas FIG. 7b illustrates a spar 1, in which the attachment structures 28 are provided in the caps and webs. The attachment structures 28 are hollow steel members with an internal threading into which a bolt or another threaded member from the hub can be fixed.

Figure 8A:
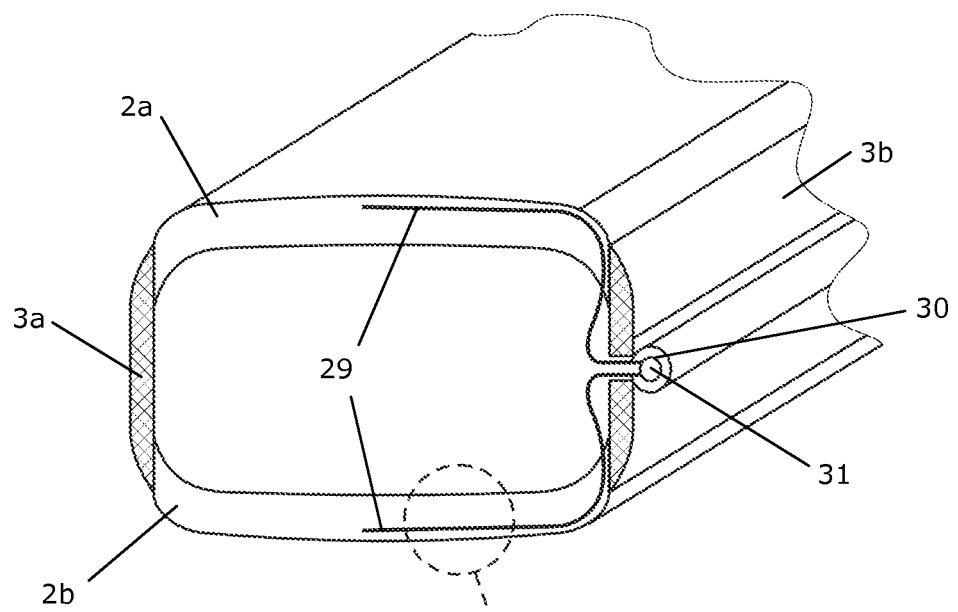
FIGS. 8a and 8b illustrate a spar comprising a lightning protection for a wind turbine blade.
Figure 8B:
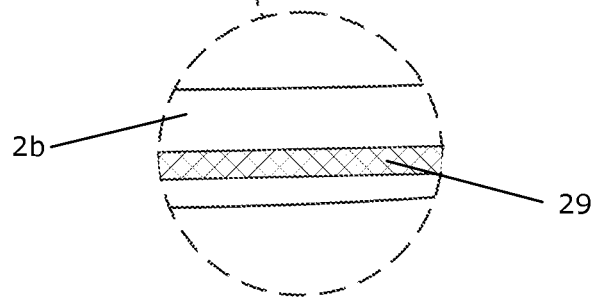

FIGS. 8a and 8b illustrate a spar 1 comprising a lightning protection for a wind turbine blade. FIG. 8b is an enlarged view of a part of FIG. 8a.

Lightning protection is provided by laminating a short circuit 29 into each of the caps 2a, 2b. The short circuits 29 connect the caps 2a, 2b electrically. The short circuits 29 are thin copper plates which are connected to each other along one side of the spar 1 in a connection 30. Furthermore, the short circuits 29 are connected to a down conductor 31.

FIGS. 9a and 9b illustrate an embodiment of an assembly tool 32 for assembling caps 2 and webs 3 of a spar 1.

The assembly tool 32 comprises a cap support structure 33 for holding each cap 2 and web support structure 34 for holding each web 3 during assembling of the spar 1.

Furthermore, the assembly tool 32 comprises an assembly structure comprises a hinge structure 35 facilitating rotation of one support 33, 34 relative to an adjacent support 33, 34.

FIG. 9a illustrates an initial open configuration of the assembly tool 32, in which the assembly tool 1 has received the caps 2 and webs 3. After having positioned the caps 2 and webs 3 in the supports 33, 34, the assembly structure facilitates that three 33a, 34a, 34b of the four support structures are lifted and rotated relative to each other and relative to the last support structure 33b which stays in its initial position having the upper support surface facing upwards. The lifting and rotational movement is controlled and limited by the hinge structure 35 of the assembly structure which facilitates correct rotation of the supports 33, 34 relative to each other.

FIG. 9b illustrates a final closed configuration of the assembly tool 32, in which the spar 1 is being assembled by connecting the joint surface portions of the caps 6 with the joint surface portions of the webs 8. The joint surface portions of the webs 8 are pressed towards the joint surface portions of the caps 6 by the support structures 34.

Details of the overlap between the joint surface portions of the caps 6 and the joint surface portions of the webs 8 can be seen in FIG. 1b.

The invention claimed is:

1. A method of manufacturing a spar for a wind turbine blade, the method comprising
providing at least two caps, each cap forming an intermediate portion between two end portions, where the end portions each forms a cap joint surface portion along a longitudinal extending edge of the end portion and the intermediate portion forms an outer surface portion of the spar,
providing at least two webs, each web being provided with web joint surface portions along opposite and longitudinally extending edges, and
connecting the joint surface portions of the caps with the joint surface portions of the webs to form a tubular configuration of the spar,
wherein the intermediate portions and the end portions are provided so that they comprise different materials.

2. The method according to claim 1, wherein the intermediate portions comprises carbon fibre reinforced plastic.

3. The method according to claim 1, wherein the end portions comprise glass fibre reinforced plastic.

4. The method according to claim 1, wherein the materials are selected so that the intermediate portions and the end portions have different characteristics with respect to strength or flexibility.

5. The method according to claim 1, wherein a transition zone is provided between the intermediate portion and the end portions, the transition zone being provided with a gradually changed composition of the different materials which the intermediate portion and the end portions comprise.

6. The method according to claim 1, wherein the end portions extend transverse to the intermediate portion.

7. The method according to claim 1, wherein the webs and caps are provided as laminated elements by moulding of at least one type of fibre material and at least one type of resin in individual moulds.

8. The method according to claim 1, further comprising a step of applying an adhesive to at least one of the joint surface portions and a step of curing said adhesive.

9. The method according to claim 1, wherein the caps and webs comprises an assembly marking facilitating positioning of the caps and webs relative to each other.

10. The method according to claim 1, further comprising a step of providing an assembly tool, and a step of arranging the caps and webs herein prior to the step of connecting the caps and webs.

11. The method according to claim 1, further comprising a step of assembling the webs from a plurality of web elements.

12. The method according to claim 1, further comprising a step of providing a short circuit in each of the caps, the short circuits connecting the caps electrically to facilitate lightning protection of the blade.

13. The method according to claim 1, further comprising a step of attaching a stiffening element to at least one of the caps, the stiffening element being arranged to increase a stiffness of the spar in the longitudinal direction.

14. A spar for a wind turbine blade, the spar having a tubular structure and being assembled from at least two caps and two webs, the caps each forming an intermediate portion between two end portions, where the end portions each forms a cap joint surface portion along a longitudinal extending edge of the end portion and the intermediate portion forms an outer surface portion of the spar, and the webs each having web joint surface portions along opposite and longitudinally extending edges, where the joint surface portions of the caps are connected to the joint surface portions of the webs, and where the intermediate portions and the end portions comprise different materials.

15. The spar according to claim 14, wherein the intermediate portions comprises carbon fibre reinforced plastic.

16. The spar according to claim 14, wherein the end portions comprise glass fibre reinforced plastic.

17. The spar according to claim 14, wherein the intermediate portions and the end portions have different characteristics with respect to strength or flexibility.

18. The spar according to claim 14, further comprising a transition zone between the intermediate portion and the end portions, the transition zone comprising a gradually changed composition of the different materials which the intermediate portion and the end portions comprise.

19. The spar according to claim 14, wherein the end portions extend transverse to the intermediate portion.

20. The spar according to claim 14, wherein at least one of the webs comprises a plurality of web elements.

21. The spar according to claim 14, further comprising a short circuit in each of the caps, the short circuits connecting the caps electrically to facilitate lightning protection of the blade.

22. The spar according to claim 14, further comprising a stiffening element attached to at least one of the caps, the stiffening element being arranged to increase a stiffness of the spar in the longitudinal direction.

23. A blade for a wind turbine comprising a spar according to claim 14.

* * * * *